Dec. 8, 1931.  E. C. BAUER  1,835,627
LINK BELT TREAD FOR VEHICLES
Filed April 2, 1928  2 Sheets-Sheet 1
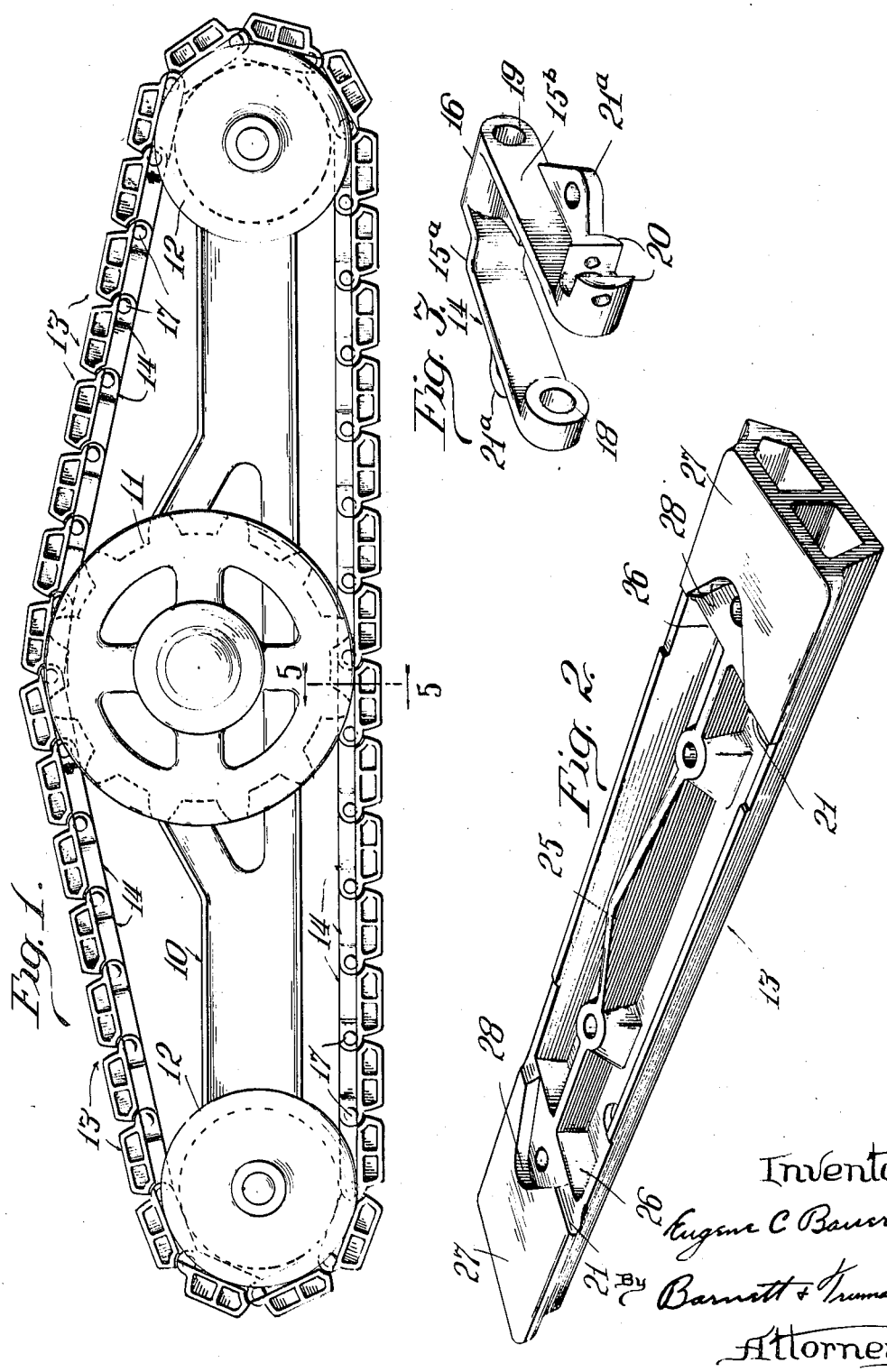

Dec. 8, 1931.  E. C. BAUER  1,835,627
LINK BELT TREAD FOR VEHICLES
Filed April 2, 1928  2 Sheets-Sheet 2
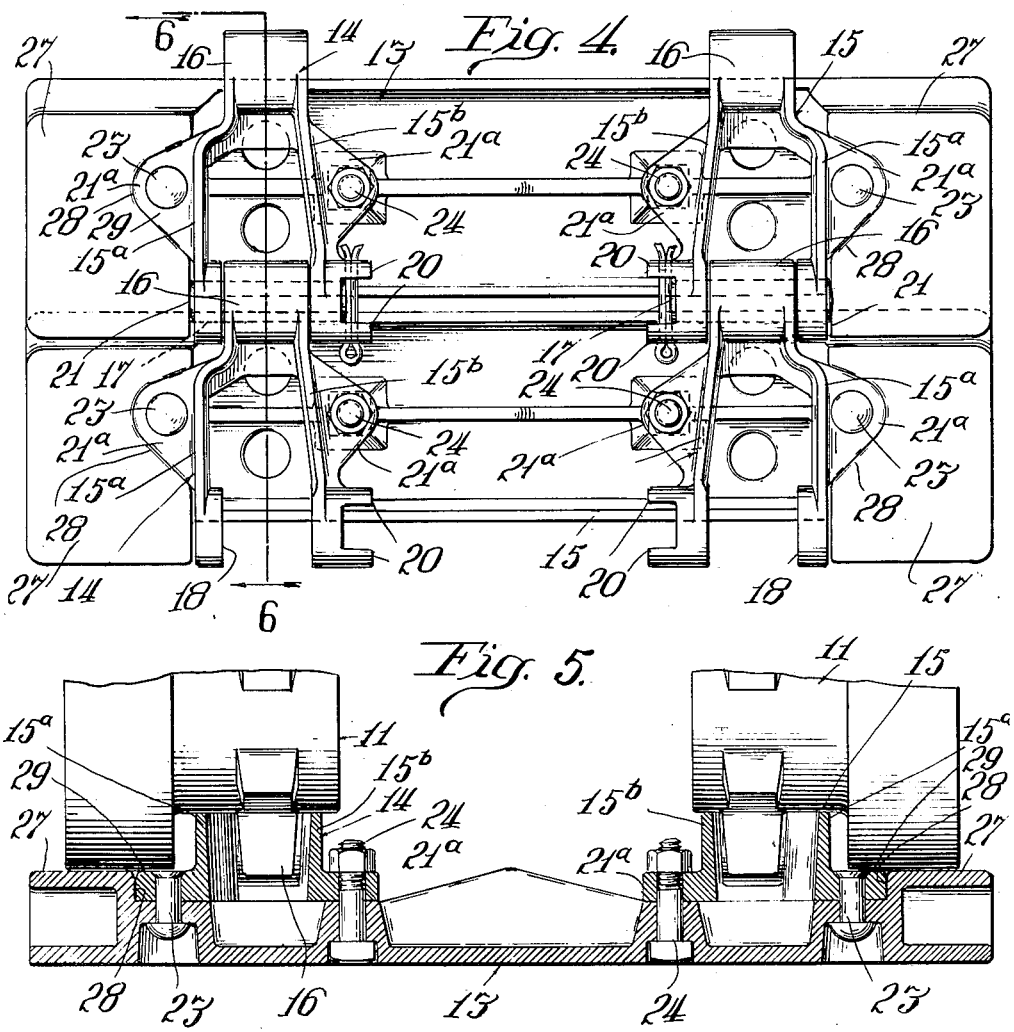
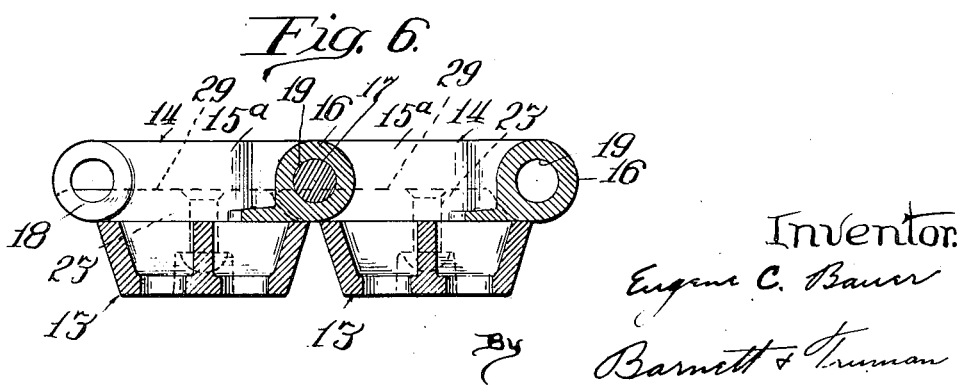
Inventor.
Eugene C. Bauer
By Barnett & Truman
Attorneys Patented Dec. 8, 1931                                                        1,835,627

UNITED STATES PATENT OFFICE

EUGENE C. BAUER, OF CHICAGO, ILLINOIS, ASSIGNOR TO KENSINGTON STEEL COMPANY, OF CHICAGO, ILLINOIS, A CORPORATION OF ILLINOIS

LINK BELT TREAD FOR VEHICLES

Application filed April 2, 1928. Serial No. 266,474.

My invention relates to improvements in link belt treads for vehicles and has for its principal object to provide a link belt tread in which the links of the belt are provided with removable shoe members which will permit worn or broken parts of the link belt to be renewed without the necessity of replacing other associated parts.

A more specific object is to provide in a construction of the above character, an improved tread shoe which is so formed as to economize in material and labor required to produce it and in which the material is so distributed throughout the shoe as to provide maximum strength at points of greatest stress.

Another object of the invention is to provide a link belt tread of the above character in which each shoe of the tread is so formed and attached to a link of the belt that the shoe and link cooperate with each other to prevent the attaching members from working loose, to minimize the shearing stresses on said members, and at the same time provide relatively wide bearing faces for the traction wheels and guiding sheaves. In this connection I contemplate as one specific embodiment, a link belt in which each link of the belt is provided with an attaching flange adapted to fit into a recess formed in the tread shoe so as to provide a firm interlocking engagement between the link and the shoe.

The invention has for a further object the provision of new and improved constructions, arrangements, and combinations of parts hereinafter described for carrying out the above stated objects and such other objects as may appear from the detailed description of the invention.

In the drawings:

Fig. 1 is a side view of the assembly of a link belt tread of a motor-driven vehicle.

Fig. 2 is a view in perspective of the inner side face of the shoe member.

Fig. 3 is a view in perspective of one of the link members of the tread to which the shoe shown in Fig. 2 is attached.

Fig. 4 is an inner plan view illustrating the manner in which a plurality of the shoe members and associated links of the belt are attached together.

Fig. 5 is a cross sectional view taken on line 5—5 of Fig. 1, and

Fig. 6 is a sectional view taken on line 6—6 of Fig. 4.

For convenience of illustration I have shown one embodiment of my invention as forming a part of the traction member of a well known type of motor-driven tractor. It will be understood, however, that the principles of the invention illustrated are not limited in their use to the type of tractor shown, but may be embodied in various types of track-laying vehicles.

In the drawings 10 designates the frame of the driving member of a tractor, 11—11 driving sprockets arranged on opposite sides of the frame member, and 12—12 designates flanged guiding rollers journaled on opposite sides of said frame member and at opposite ends thereof. The link belt tread, forming the substance of my invention, extends over the said driving sprockets and guiding rollers. It consists preferably of two endless chains adapted to mesh with the driving sprocket and held in spaced relation to each other throughout the lengths of the chains by means of transversely extending shoe members 13 secured rigidly at opposite ends to transversely aligned links 14 and 15 of the inner and outer chains. The links are of the same general construction except that they are made in right and left-hand as shown in Fig. 4. For the purpose of convenience the left-hand link, that is to say, a link of the inner chain, is shown in detail in Fig. 3. Each of the said links consists of side bars 15$^a$ and 15$^b$ connected at one end of the link by a cross bar 16. The other end of the link is open and embraces the closed end portion of the next adjacent link of the chain. A pivot pin 17 extends through eyelet 18 of the side bar and through a central bore 19 of the cross bar 16. The pin 17 is held in its operative position by means of a cotter pin extending through ears 20 formed on the inner side bars of each link. The other end of the pin is arranged to bear against a shoulder 21 of the tread shoe. The side bars of each link are formed with portions 21ª—21ª, preferably in the form of laterally extending flanges, to which a shoe member 13 of the link tread is rigidly attached by means of a rivet 23 and a bolt 24.

The shoe member is preferably channel shaped in cross section so as to provide maximum strength and rigidity for a minimum amount of metal. A centrally disposed reinforcing rib 25, having its greatest height at the center of the shoe, extends longitudinally of the shoe so as to provide additional reinforcements. The end portions of the shoe are formed with transverse reinforcements 26—26 and with flat bearing surfaces 27—27 which bear against the peripheral bearing surfaces of the driving sprockets 11—11 and the guiding sheaves 12—12.

In order to provide a relatively wide bearing surface at the ends of each shoe, the said bearing surfaces 27—27 are each formed with a recess 28 adapted to receive one of the flanges 21ª—21ª of the associated link of the chain. In Fig. 5 of the drawings, it will be observed that the recess 28 at one end of the shoe receives the attaching flange 21 of the link of the inner chain and that the recess 28 at the opposite end of the shoe receives the attaching flange 21ª of the link in the outside chain. The recesses 28—28 are preferably of such depth that the surfaces 29 of the attaching flanges 21ª—21ª will be flush with the end bearing surfaces 27—27 of the shoe. With this construction, the upper end of the rivets 23 are also formed flush with the surface 29 of the attaching flanges 21ª—21ª. In order to relieve the rivets 23 and bolts 24 of shearing stresses and to provide also an interlocking engagement between the chain links and the tread shoe, the recesses 28—28 are formed preferably to correspond substantially to the configuration of the attaching flange. With this construction the attaching flanges bear against the wall of the recesses so as to take the major portion of the traction strain.

While I have shown and described one specific embodiment of my invention, it will be obvious that the various parts of the construction shown might be varied to fit the ideas of the invention to link belt treads for vehicles of different types from that illustrated in the drawings. It will therefore be understood that I contemplate all such changes in structure as come within the scope of the appended claims.

I claim:

1. A link belt tread for vehicles, comprising link members open at one end and adapted to embrace the closed ends of adjacent links, pivot pins for securing said links together, shoe members fitted over said links and formed with end bearing surfaces adapted to bear against relatively movable parts of a vehicle and formed with portions providing abutments for said pins.

2. A link belt tread for vehicles, comprising link members open at one end and adapted to embrace the closed ends of adjacent links, pivot pins for securing said links together, shoe members recessed to fit over said links; the walls of said recessed portions of each shoe being disposed to provide abutments for said pivot pins.

3. A belt tread for vehicles composed of a series of pivotally connected sections, each section comprising a shoe member channel-shaped in cross section provided with a reinforcing rib extending lengthwise of the shoe and also provided at opposite ends with inner bearing faces for engagement with belt supporting members of a vehicle, and chain link members formed with lateral attaching flanges secured to said reinforcing rib at locations adjacent the said bearing faces of said shoe and adapted, together with said shoe bearing faces, to provide trackways for belt supporting members of the vehicle; each of said inner faces of the shoe being recessed to receive one flange of a chain link member to provide an interlocking engagement of said link member and shoe.

4. In a link belt tread for vehicles, a link member formed with a barrel end and integral side bars, one of said side bars being offset with relation to an end face of the barrel end and disposed in a plane parallel to said end face whereby the outer faces of the said offset side bars of successive link members are in substantial alignment, flanges formed integrally with said side bars and extending outwardly therefrom for attachment to a tread shoe member of the belt, the flange formed on said offset side bar being adapted to engage tread supporting members of the belt.

EUGENE C. BAUER.